C. A. KUHN.
CRANK SHAFT.
APPLICATION FILED MAY 31, 1918.
1,337,081.
Patented Apr. 13, 1920.
2 SHEETS—SHEET 1.
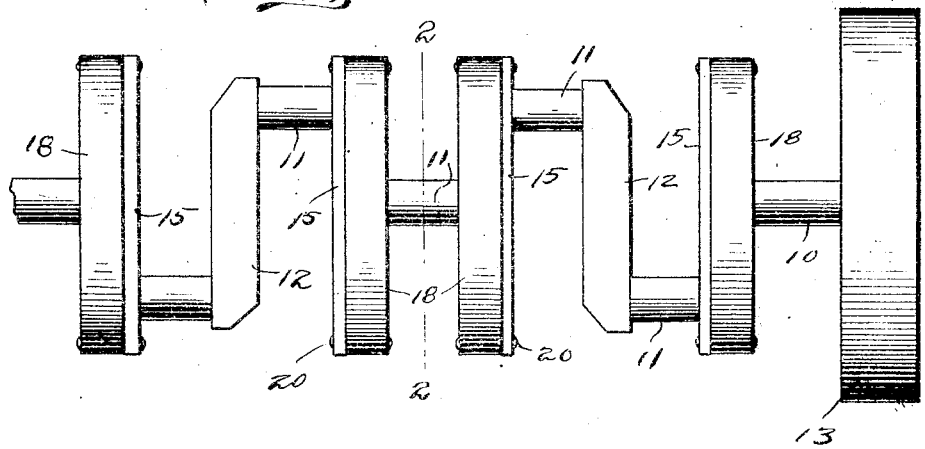
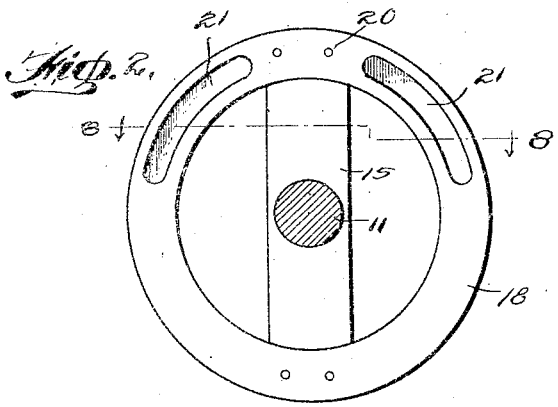
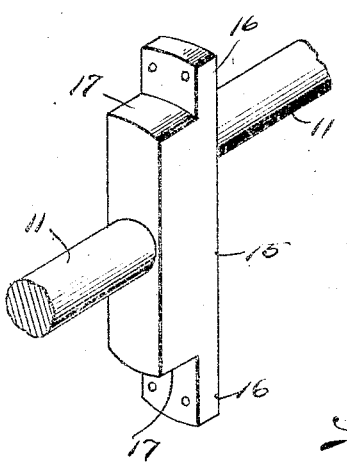
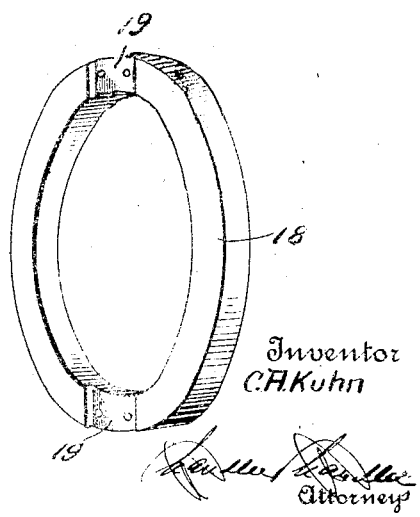
Witnesses
Inventor
C. A. Kuhn
By
Attorneys

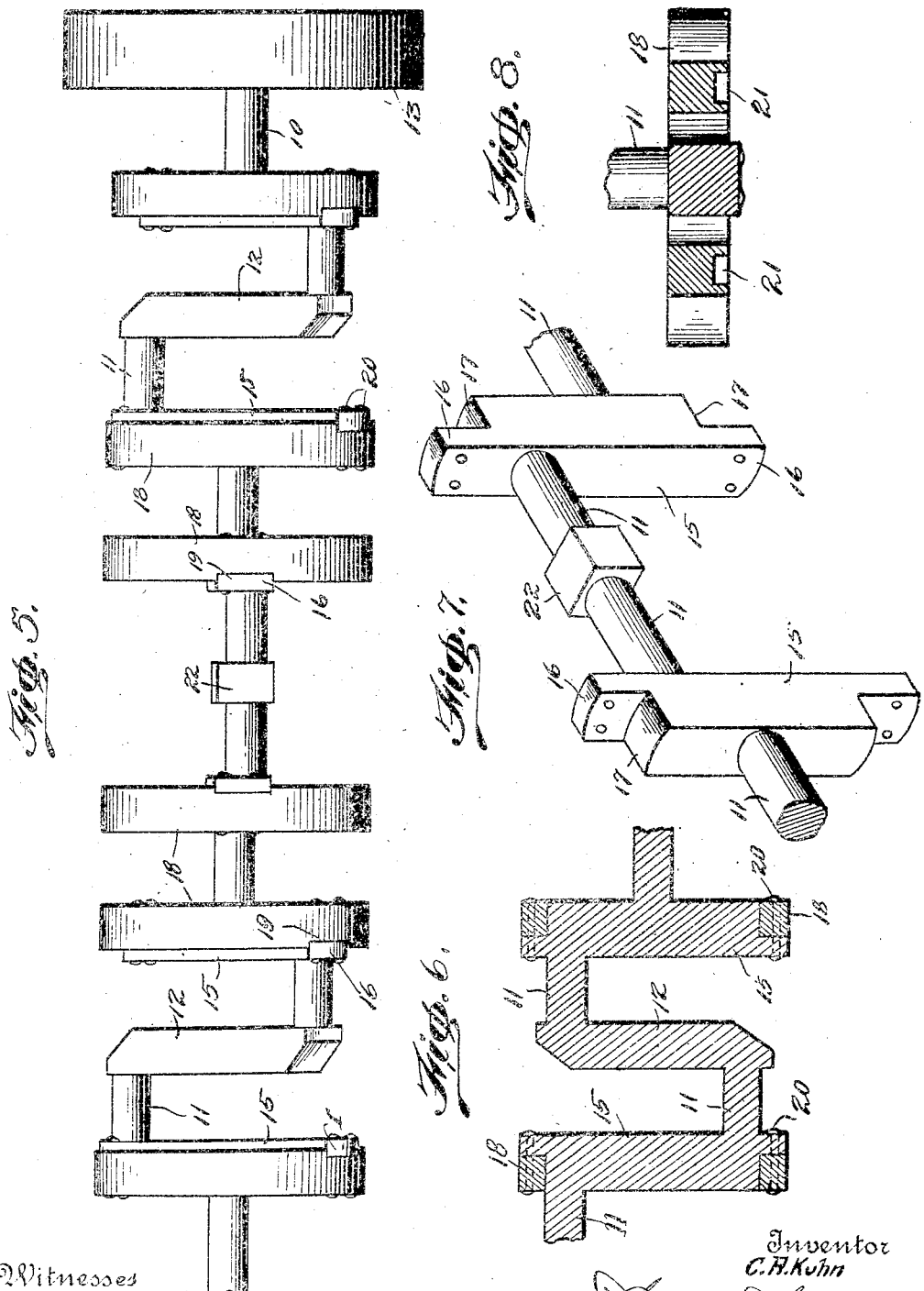

UNITED STATES PATENT OFFICE.

CLARENCE A. KUHN, OF FORKS, NEW YORK.

CRANK-SHAFT.

1,337,081.

Specification of Letters Patent.  Patented Apr. 13, 1920.

Application filed May 31, 1919. Serial No. 337,583.

*To all whom it may concern:*

Be it known that I, CLARENCE A. KUHN, a citizen of the United States, residing at Forks, in the county of Erie, State of New York, have invented certain new and useful Improvements in Crank-Shafts; and I do hereby declare the following to be a full, clear, and exact description of the invention, such as will enable others skilled in the art to which it appertains to make and use the same.

This invention is an improvement in internal combustion engines and has particular reference to a crank shaft therefor.

An object of the invention is to reduce the usual proportionate weight of the fly wheel of a crank shaft and distribute the said reduced weight throughout the shaft to the end that such distribution will enable the shaft to better withstand the force of the explosions and also reduce the amount of vibration with a resultant saving of bearings and other parts.

The inventive idea involved is capable of receiving a variety of mechanical expressions some of which, for the purpose of illustrating the invention, are shown in the accompanying drawings wherein:—

Figure 1 is a side elevation of one form of crank shaft constructed in accordance with the invention.

Fig. 2 is a transverse section on the line 2—2 of Fig. 1.

Fig. 3 is a perspective view of one of the connecting webs or arms of the shaft.

Fig. 4 is a similar view of a counterbalancing ring member employed in connection with the invention.

Fig. 5 is a view similar to Fig. 1 showing another form of shaft.

Fig. 6 is a longitudinal section through a portion of either of the shafts shown in Figs. 1 and 5.

Fig. 7 is a fragmentary perspective view of the shaft shown in Fig. 5.

Fig. 8 is a section on the line 8—8 of Fig. 2.

The invention is illustrated in what is now believed to be its preferred form wherein the shaft 10 includes a plurality of crank pins 11 corresponding in number to the number of cylinders in the engine, certain of said crank pins being connected by the ordinary webs or arms 12. One end of the shaft 10 carries the usual fly wheel 13 which may be of any desired construction except that it is proposed to decrease the weight thereof and make the same smaller than the ordinary sized fly wheel, although it is to be understood that this fly wheel may be of the ordinary size if desired.

In decreasing the size and weight of the fly wheel, it is further proposed to distribute this weight throughout the body of the crank shaft and lend additional weight thereto so that the shaft will be better enabled to withstand the force of the explosions of the engines and also reduce the amount of vibration. To this end, the end and intermediate crank pins 11 are preferably connected by webs or arms 15, which are diametric bars elongated substantially of rectangular formation and of sufficient thickness to secure the adjacent ends of the pins therein in any preferred manner although it will be understood that said pins may be made integral with the webs. Each end of the web 15 is reduced on one side to provide a flange 16 forming a shoulder 17, and the outer edges of the flanges and the shoulders are preferably though not necessarily arcuate or curved on lines concentric with a transverse axis of the web. The length of each of the webs 15 is preferably slightly greater than the webs 12 and less than the diameter of the fly 13 as is clearly shown in Fig. 1, which fact will slightly increase the weight of the body of the crank shaft over that of the ordinary shaft.

In order to add weight to the body of the shaft and distribute this weight evenly throughout the length thereof, use is preferably made of a plurality of counterbalancing ring members 18 made of any desirable heavy material such as steel and corresponding in number to the number of webs 15. One of these ring members 18 is mounted on each of the webs 15 and the internal diameter of the ring member is equal to the length of the webs between the shoulders 17 thereof. Said shoulders are curved to conform to the curvature of the ring so that the latter may be mounted upon the webs with its inner periphery in engagement with the shoulders and one face thereof in engagement with the adjacent face of the flanges 16. The ring members may be made of a diameter equal to or greater than the length of the webs 15 according to the amount of weight it is desired to add to the shaft. Each ring member is provided with oppositely disposed recesses or depressions 19 in one face thereof adapted to receive the ends of the web 15 to which the ring member is attached. Each ring member is formed with depressions 21 or otherwise reduced in weight on either side of the end of the web 15 adjacent the crank pin so that the ring member will be made lighter at this portion thereof. In the construction of the shaft just described, the part of each ring member opposite the crank pin should be equal in weight to the combined weight of the crank pin, connecting rod and bearing therefor. In the six pin shaft shown in Fig. 5, the weight of the ring member opposite the crank pin should be equal to the combined weight of the crank pin, connecting rod and bearing and one half the weight of the ordinary web or arm 12 and in this manner the parts will be properly balanced.

The two innermost webs 15 of the shaft shown in Fig. 5, have their crank pins 11 arranged directly opposite each other and connected by the web 22 while the crank pins of the other webs are arranged at proper angles with respect to each other to correctly time the strokes of the different pistons.

What is claimed is:—

1. A crank shaft including a plurality of crank pins, webs connecting the pins and having their ends reduced to provide flanges and shoulders the surfaces of which are curved on lines concentric with the transverse axes of the webs, and ring members mounted upon said webs and engaging said shoulders, the rings having side recesses receiving said flanges and being fixed to the latter.

2. A crank shaft including a plurality of crank pins, diametric bars constituting webs connecting the pins and having their ends provided with shoulders the surfaces of which are curved on lines concentric with the axis of the shaft, and counterbalancing annular members mounted upon said webs and engaging said shoulders, said members being channeled whereby they are reduced in weight at points adjacent their respective crank pins.

In testimony whereof I affix my signature, in the presence of two witnesses.

CLARENCE A. KUHN.

Witnesses:
 ARCHER A. STOCK,
 JOHN WEBER, Jr.